United States Patent [19]

Joseph et al.

[11] 4,180,421
[45] Dec. 25, 1979

[54] TORSION BAR AND METHOD OF FORMING THE SAME

[75] Inventors: George L. Joseph, Morgan Hill, Calif.; Charles A. Brolin, Cedar Rapids, Iowa

[73] Assignee: FMC Corporation, San Jose, Calif.

[21] Appl. No.: 944,421

[22] Filed: Sep. 21, 1978

Related U.S. Application Data

[62] Division of Ser. No. 863,558, Dec. 22, 1977, Pat. No. 4,131,491.

[51] Int. Cl.² .......................... C21D 9/28; C21D 9/30
[52] U.S. Cl. ................................. 148/150; 148/12 B; 148/36; 148/39; 148/152; 148/154
[58] Field of Search ................. 148/154, 150, 152, 36, 148/39, 12 B

[56] References Cited

U.S. PATENT DOCUMENTS

| | | | |
|---|---|---|---|
| 2,599,575 | 6/1952 | Morgan | 148/39 |
| 2,843,374 | 7/1958 | Boeghold | 148/39 |

OTHER PUBLICATIONS

Osborn, Jr., H. B.; *Source Book on Heat Treating*, Vol. I, Materials and Processes; Compiled by ASM; 1975; pp. 280–282.
Wuerfel, Richard K., ibid.; pp. 293–295.
Kirk, Clayton L., ibid.; pp. 287–289.

*Primary Examiner*—W. Stallard
*Attorney, Agent, or Firm*—A. J. Moore; J. F. Verhoeven

[57] ABSTRACT

A method of forming a torsion bar wherein steel, preferably an alloy steel of medium carbon content, is formed in the desired size and shape and is through hardened for providing a desired core hardness. The case of the bar is then hardened for transforming austenite in the case into martensite causing the case to expand thereby inducing high compressive stresses near the surface with the compressive stress decreasing radially inward of the surface. The core of the bar is retained below lower transformation temperature for resisting expansion of the case thereby inducing hoop and axial compressive stresses and radial tensile stressed in the case.

A torsion bar formed by the method of the present invention is also disclosed.

10 Claims, 34 Drawing Figures

FIG_1

FIG_2

FIG_3

BEFORE PRESET

FIG_4

AFTER PRESET

FIG_5

FIG_6

FIG_7
INDUCTION HARDENING

FIG_8

FIG_9
INITIAL TWIST OF COLD WORKING

FIG_10

FIG_11

FIG_12
RELAX INITIAL TWIST

FIG_30

FIG_31

FIG_33

FIG_34

| PRESETTING | AISI STEEL ALLOYS (CYCLES) | | | |
|---|---|---|---|---|
| TORQUE IN FT. LB. PER CYCLES | 4130 | 4140 | 4150 | 4340 |
| 8442 | 1 | 1 | 1 | 1 |
| 8442 | 2 | 2 | 2 | 2 |
| 8442 | 3 | 3 | 3 | 3 |
| 8707 | 4 | | | |
| 8707 | 5 | | | |
| 8707 | 6 | | | |
| 8970 | 7 | 4 | 4 | 4 |
| 8970 | 8 | 5 | 5 | 5 |
| 8970 | 9 | 6 | 6 | 6 |
| 9498 | | 7 | 7 | 7 |
| 9498 | | 8 | 8 | 8 |
| 9498 | | 9 | 9 | 9 |
| MAXIMUM DEGREES OF PERMANENT SET | 45° | 14° | 21° | 8° |

TORSION BAR AND METHOD OF FORMING THE SAME

CROSS-REFERENCE TO RELATED APPLICATION

This is a division of my application Ser. No. 863,558 filed on Dec. 22, 1977, now U.S. Pat. No. 4,131,491 which issued on Dec. 26, 1978.

BACKGROUND OF THE INVENTION

Torsion bar springs are, of course, quite old in the art and have been used for many purposes including the resilient suspension of vehicles on tracks or wheels. The life span of through hardened torsion bars used on heavy, high speed military or lumber vehicles in off-road environments have not been completely satisfactory in the past. The prior art bars not only creep under severe torsional loads, but also break too frequently, with the break almost always occuring near one end of the bar at the anchor point. Because the breakage occurs at one of the anchoring ends of the bar, one practice previously followed to extend the uniformity and life span of torsion bars was to make the ends larger thus requiring larger and more expensive mounting for the torsion bars.

U.S. Pat. No. 2,843,374 which issued to Boegehold on July 15, 1958 discloses one method of forming torsion bars. In accordance with this prior art method, a high carbon steel shaft of between 0.72 to 0.95% carbon and a 0.30 to 0.60% manganese is required. The high carbon steel bar is austenized by heating in a neutral salt bath at 1500° F. to 1550° F. for 45 minutes. This long heating interval is followed by rapid cooling of the bar as by quenching in a caustic solution. The bar is thereafter tempered at less than 500° F. to provide a case or shell hardness of about 55 to 60 Rockwell C, and a core hardness of about 38 to 47 Rockwell C. In the "as quenched" condition, the shell or case is said to have a hardness of about 62 to 67 Rockwell C for a relatively shallow depth. In fatigue tests, the patentee indicates that failures occurred with a series of bars after 700,000 cycles, and that one bar was run for 1,000,000 cycles without failure under a stress range of 39,000 to 100,000 pounds per square inch.

SUMMARY OF THE INVENTION

In accordance with the present invention, a steel bar of cylindrical cross section is formed into a torsion bar, which steel bar is preferably a steel alloy bar having a medium carbon range of 0.28-0.60% carbon. After being formed into the desired size and shape, the bar is through hardened by heat treatment or cold working to a Rockwell hardness of between C20 to C45. This bar is then case hardened, preferably by induction hardening, which involves heating the bar to above about 1550° F. and thereafter quickly quenching the bar to below the plastic range. Case hardening cases austenite within the case to transform into martensite which causes the outer portion of the bar or case to expand faster than the inner portion of the bar. This transformation of the case, but not of the core, induces hoop and axial compressive stresses and radial tensile stress in the case with the magnitude of the stresses determined by the percent of martensite in the case at various depths and by the strength of the core and case to core interface. The hardness of the case at 0.010 inches below the surface will be maintained at a minimum of Rockwell C46 in accordance with the present invention. The yield strength of the bar in the direction in which the torsional force is to be applied is then preferably increased by directional cold working. Cold working involves presetting the bar by twisting the bar beyond its initial elastic limit, releasing the twisting torque, and repeating this cold working step at least once more.

After performing the above steps, a torsion bar is formed and is capable of handling the same torsional stresses as prior art torsion bars but is of smaller diameter than the prior art torsion bars. Accordingly, the torsion bars formed by the present method fit in smaller places and require less expensive connecting components such as road arms, trunnions, bearing housings, seals, and other supporting structures if the bar is to be used in a vehicle suspension system.

DESCRIPTION OF THE PREFERRED EMBODIMENT

Figure 1:
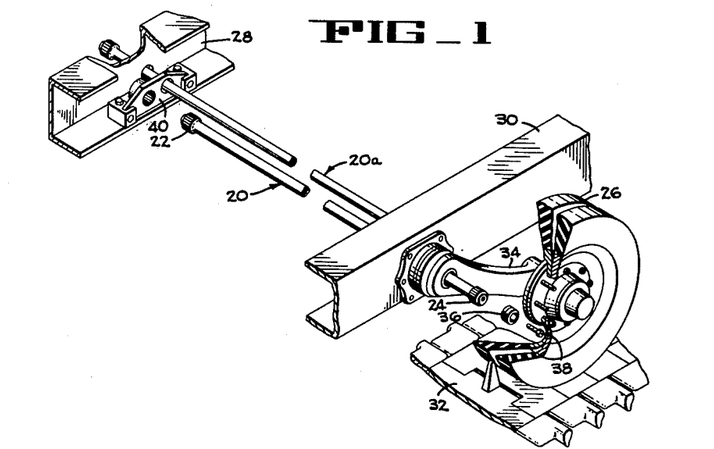
FIG. 1 is a fragmentary perspective with parts cut away illustrating a pair of torsion bars in a typical tracked vehicle supporting environment.
Figure 2:
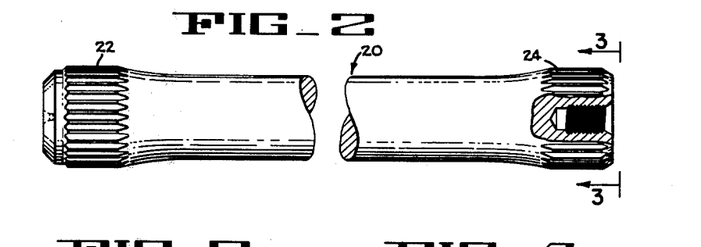
FIG. 2 is a side elevation of one of the torsion bars illustrating the non-circular end portions as splines, the center portion of the bar being cut away.

The case hardened torsion bar 20 (FIGS. 1-4) of the present invention preferably comprises an elongated steel alloy bar having a medium carbon content of between 0.28 to 0.60 percent carbon. It will be understood that other steels with the same hardenability characteristics may also be formed into torsion bars by the present method. The bar 20 is of cylindrical cross section and is provided with non-circular end portions which are illustrated as splines 22,24. A typical application of torsion bars is illustrated in FIG. 1 wherein two bars 20 and 20a are shown resiliently mounting the road wheels 26 (only one being shown) to the longitudinal frame members 28,30 of the chassis of a vehicle supported on tracks 32 (only one track being shown). One end of a road arm 34 rotatably supports the wheel 26 which rides on the track 32, while the other end of the road arm is pivotally supported by the frame member 30. The splined end 24 of the torsion bar 20 is received in mating splines in the road arm 34 and is held from axial movement by suitable means such as a snap ring or the illustrated apertured plug 36 and a capscrew 38 screwed into threaded portions of the road arm and torsion bar, respectively. The other splined end 22 of the torsion bar is fitted into a splined anchor bracket 40 secured to the other frame member 28 of the vehicle chassis. It will be noted that the torsion bar 20 is a left hand bar and accordingly will be preferably directionally preset and cold worked after through hardening and case hardening by directionally twisting the bar in a counterclockwise direction as indicated by an arrow A in FIG. 4, which arrow indication will be stamped on the end of the bar. The torsion bar 20a which aids in resiliently supporting the other, or right, track (not shown) is preferably preset and cold worked in the opposite direction.

Although the torsion bar 20 has been illustrated as being used in a vehicle suspension system, it will be understood that the torsion bars can be used in other fields and that the term "torsion bar" or "torsion bar spring" as used herein is to be considered broadly enough to cover shafts, springs, and other similar members that are subjected to torsional loads.

Figure 5:
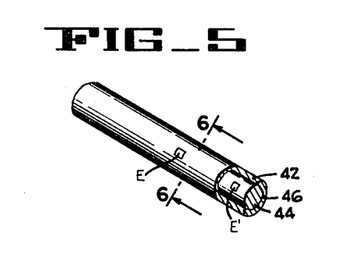
FIG. 5 is a perspective of a portion of the bar illustrating the approximate relationship of the case and the core of a fragment of the torsion bar and further illustrating at greatly exaggerated scale, one of an infinite number of stress elements on the surface of the case of the induction hardened bar and a similar element on the core.
Figure 6:
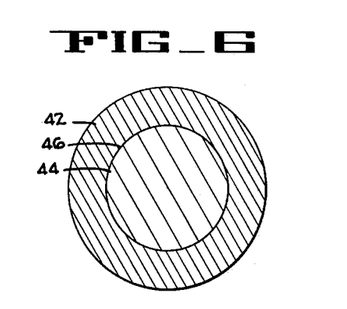
FIG. 6 is a section taken along lines 6—6 of FIG. 5 diagrammatically illustrating the case and core at a larger scale.

After the case hardening step has been completed, the composition of the alloy in the outer portion or case 42 (FIGS. 5 and 6) of the bar 20 is transformed from austenite to martensite while the composition of the inner portion or core 44 of the bar is unaffected and remains in its through hardened state. The interface 46 between the case 42 and the core 44 is indicated by the circle 46 in FIG. 6 although it will be understood that a gradual blend of the two materials occurs at the interface which is approximately 0.05 inches thick.

As will be discussed below, tests were conducted by applicant on through hardened bars, and also on case-hardened bars formed by the method of the present invention. Since the tested case hardened bars had their cases hardened by "induction hardening", the case hardening step will at times be referred to as "induction hardening". It will be understood, however, that the term case hardening is not to be construed as being limited to induction hardening but is to be construed broadly enough to cover "flame hardening" and other hardening methods which transform austenite in the case into martensite causing the case to expand thereby inducing high compressive stresses near the surface of the case with the compressive stress in the case preferably decreasing radially inward of the bar from the case surface to the inner radius of the case. However, in higher hardenability steels the hardness of the case may be constant throughout its depth.

Induction hardening very rapidly increases the temperature of the outer surface of the case to a temperature range of about 1500° F. to 1650° F. followed by a very rapid cooling of the bar so that the lower transformation temperature will be reached only in the case and not in the core. The case is heated and thereafter cooled by an electrical heating annulus followed by a liquid cooling ring both of which are advanced axially along the body of the bar at the rate of about 19.8 inches per minute and along the splines at about 18 inches per minute. During this time the bar rotates at a rate of 128 revolutions per minute. The surface of the case is heated to a maximum temperature of about 1600° F.-1700° F. and remains at this maximum temperature range for about 8 to 10 seconds and is then cooled by quenching to below the transformation temperature resulting in transformation of austenite into martensite in the case. The core remains in its initial state. The core temperature remains below about 1350° F. during induction hardening, and the rate of cooling is reduced by adding increasing percentages of tenexol. The addition of about 15 to 20% tenexol to the water produces the preferred martensite gradient in the case. Tenexol is a liquid sold by Yuconquenchant, Downey, Calif., U.S.A.

Flame hardening of the case provides substantially the same end result as induction hardening. Flame hardening comprises the steps of heating by flame followed by quenching as is well known in the art.

In order to aid in understanding the theory behind the torsion bar forming method of the present invention, it will be understood that a multiplicity of elements E (FIG. 5) may be considered to exist in the surface of the case of the bar and that the stresses applied to each element are identical. Similarly, a multiplicity of elements E' exist in the core 44 near the interface 46 and that the stresses applied to each element E' are identical. In the theoretical explanation of the stresses applied during the case hardening and the preferred following cold working steps of the method, typical stresses associated with these elements E and E' will be given for illustrative purposes only.

Prior to discussing the several steps of the method of the present invention it is believed that a broad discussion of tests performed by applicant, or by others under the direction of applicant, on a number of torsion bars will be helpful at this time.

In an attempt to increase the life span of torsion bars used in assignee's vehicles, applicant has formed and tested to destruction 99 torsion bars. All torsion bars were identical in size and shape. Each bar has a diameter of 1.605 inches, an effective length of 57.72 inches, and had splines on each end with a root diameter of 1.858 inches and a major diameter of 1.9350 inches. All torsion bars were twisted through a stress range of 40,000 to 130,000 psi, and the cycles at which failure of each bar occurred was recorded. Several alloy steels in the medium carbon range were used, and the type of heat treatment used, and the hardness achieved was recorded for most bars. Also, on the latest bars tested, the preset stress per cycle, the preset angle per cycle, and the number of cycles used during preset were also recorded.

Sixty-five of the ninety-nine bars tested were through hardened, not induction hardened, bars formed from AISI 4150 alloy steel bars. All of these bars except three failed at one of the splined ends. It has been determined that failure of a torsion bar at the point of connection with another member, such as at either of its splined ends, will damage the mating connecting member thereby requiring replacement of the connecting member as well as the replacement of the broken torsion bar. The other three bars failed in the body section for unrecorded reasons.

Of this group of 65 through hardened torsion bars the number of bars which failed within the following cycle ranges are as indicated below:

| Cycles | Number of Bars |
| --- | --- |
| 0-100,000 | 35 |
| 100,000-150,000 | 21 |
| 150,000-200,000 | 6 |
| 200,000-500,000 | 3 |
| Above 500,000 | None |

The 34 remaining bars tested were induction hardened bars with all of the failures occurring in the body of the torsion bar, not in the splined end portions, thereby doing little if any damage to the mating connecting portions when failure occurred. The number of induction hardened test bars which failed within the following cycle ranges are as indicated below

| Cycles | Number of Bars |
| --- | --- |
| 0-100,000 | 8 |
| 100,000-150,000 | 0 |
| 150,000-200,000 | 3 |
| 200,000-500,000 | 18 |
| 500,000-1,000,000 | 4 |
| Above 1,000,000 | 1 |

Of the 8 induction hardened bars that failed below 100,000 cycles, two of the bars were AISI 4150 alloy steel and were drawn (tempered) to a temperature of 700° F. after induction hardening with one bar twisting off on the first cycle and the other bar lasting about 75,000 cycles. The 75,000 cycle bar failed due to a shallow case, a soft case, a soft core and loss of residual compressive stress due to the high draw temperature of 700° F. The one cycle bar had the same improper structure but in addition the one cycle bar failed due to an initial excessive preset torque which twisted the bar off before it could be cold worked to adequate strength. Two other long life bars of the same material (AISI 4150) were drawn at 400° F. resulting in retention of beneficial compressive stress. These bars also had thicker cases with one bar lasting 1,182,900 cycles and the other lasting 389,500 cycles, respectively, with the difference in cycles believed to be attributed to the thick case of the long life bar and because both the case and core of the long life bar was considerably harder than that of the 389,500 cycle bar.

The cause of early failure of two additional induction hardened AISI 4150 bars was believed to be due to improper surface treatment of one bar, and drawing the other bar to 700° F. An AISI 4130 bar was believed to fail early primarily because it contained a non-metallic inclusion.

The other two induction hardened test bars that failed before 100,000 cycles were AISI 4140 and AISI 4340 alloy steel bars. The 4140 bar failure was attributed primarily to a low case depth and a low core hardness indicating undesirable induction hardening techniques. The failure of the 4340 bar was attributed to improperly presetting the bar.

In addition to the above reasons for early bar failure, it is known that certain bars have failed earlier than expected because of non-metallic inclusions in some bars, and because of surface blemishes on other bars. Although the above defects and ranges of chemical composition of the steel alloys in the bars cannot be solved unless more precise tolerances are provided by the suppliers of the bars, failures due to surface defects can be minimized by care in machining and handling of the bars. Also, the surface of each bar is preferably protected by a protective treatment or coating such as coating the bar with plastisol over adhesive primer and protecting the bare end by coating with zinc rich primer.

In accordance with the present invention, the method of forming torsion bars include the following steps, with certain of the steps being optional.

Selecting a Steel with Hardenability Characteristics of an Alloy Steel with Medium Carbon Content Alloy steels with medium carbon content are the preferred types of steel used for the torsion bars of the present invention. The carbon content of these alloy steels is generally within the range of about 0.28 to 0.60 percent carbon. The following AISI alloy steels are representative of steels that fall within this range; 4130; 4135; 4140; 4145; 4150; 4155; 4330; 4335; 4340; 4345; 4350 and 4355. It will, of course, be understood that other steels of substantially the same hardenability characteristics may also be used in accordance with the method of the present invention.

Sizing and Shaping the Bar

After the type of steel has been selected, the bar is cut to desired length from cylindrical bar stock as rolled, and is shaped by providing non-circular connecting end portions such as splines 22,24 by conventional machine shop practices such as upsetting or turning from the bar stock. The machined bar should be free from nicks, scratches and tool marks, and should not include any sharp radii which might induce fractures. If the non-circular end portions are splines, the end portion should be cold formed, shaped, hobbed or form ground.

The torsion bar when formed in accordance with the preferred method of the present invention eliminates or reduces creep to a minimum, i.e., both ends of the bar will return or substantially return to their initial angular position after being used for long periods under normal working stresses. Because of this desirable non-creep feature, the position of the spline teeth in the anchor bracket 40 (FIG. 1) and the road arm 34 need not be adjustable since the angular position of the teeth of spline 24 (foreground teeth) may be preset by twisting the bar relative to the teeth of the spline 22 (background teeth) thereby positioning and maintaining the road arm 34 in its desired angular position.

Figure 3:
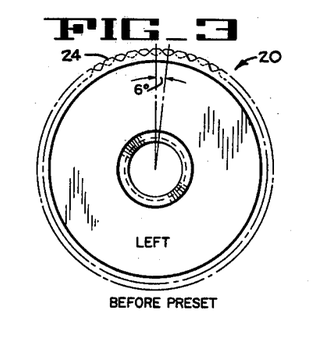
FIG. 3 is an end view of the torsion bar looking in the direction of arrows 3—3 of FIG. 2 illustrating the relative position of the splines on both ends of the bar after the bar has been machined, heat treated, but before it has been preset.
Figure 4:
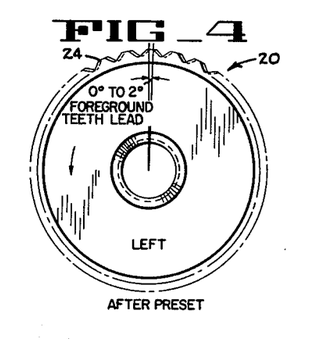
FIG. 4 is an end view similar to FIG. 3 illustrating the foreground splined teeth leading the background teeth by about 0° to 2° after preset.

The amount of preset after hardening varies with the type of steel being used. FIGS. 3 and 4 represent the relative position of the splines before and after preset for AISI 4130, 4150 and 4340 alloy steels. As indicated in FIG. 3, before presetting, the teeth in the background are offset 6° from the teeth in the foreground. After preset the teeth in the foreground lead the teeth in the background 0° to 2°. With AISI 4140 steel, the foreground and background teeth are aligned before preset, and the foreground teeth lead the background teeth 0° to 2° in the direction of preset after preset.

It will be understood that the above tooth alignment is achieved during machining and not by presetting. It is also understood that tooth alignment is independent of the latter multiple step cold working presetting operation which is a preferred step and is performed after the through hardening and case hardening steps have been completed as will be described hereinafter.

Through Harden the Bar

The bar is through hardened to provide a core hardness of between about Rockwell C20 to C45 by heat treating or cold working. Preferably, through hardening of the bar is performed by quenching and tempering. The preferred hardness range varies with the type of steel alloy selected for the torsion bar spring. The preferable range for the following alloys is as follows:

| AISI 4130 | Rockwell C20–C25 |
| --- | --- |
| AISI 4140 | Rockwell C30–C35 |
| AISI 4150 | Rockwell C30–C35 |
| AISI 4350 | Rockwell C30–C35 |

During through hardening the bars are raised above their lower transformation temperatures to change the structure to austenite. Thereafter the bars are rapidly cooled to change their structure to martensite and other metallic structures.

Harden the Case of the Bar

After the core of the bar has been through hardened the case of the bar is hardened by induction hardening, or the like, to provide a case depth of between about 20 percent to 45 percent of the bar radius depending upon the type of steel used. The hardness of the case at 0.01 inch below the surface should be a minimum of Rockwell C46. The preferred hardness range at 0.01 inches below the surface of the four steel alloys tested is as follows:

| AISI 4130 | Rockwell C46–C51 |
| --- | --- |
| AISI 4140 | Rockwell C53–C56 |
| AISI 4150 | Rockwell C54–C58 |
| AISI 4350 | Rockwell C51–C56 |

Drawing (tempering) of the bar at 400° F. is permitted after the induction hardening when using AISI 4150, but is not permitted with the other three alloy steels mentioned above. A temperature control furnace is used during drawing at 400° F.±20° F. which drawing step requires about 1 hour per inch of bar thickness. After drawing is completed the bar is cooled in air.

FIGS. 30 to 33 are graphs indicating the permissible Rockwell C hardness ranges of the case, the core, and the case-core interface at distances from the outer surface of the bar for AISI 4130; 4140; 4150; and 4350 alloy steels, respectively.

Cold Working the Bar After Hardening

After each torsion bar has been case hardened, each bar is preferably directionally preset in the direction of application of the working load by twisting each bar beyond its initial elastic limit and releasing it at least twice. Presetting the bar achieves increased directional yield strength and provides beneficial residual stresses in the bar as will be explained in more detail hereinafter.

Figure 34:
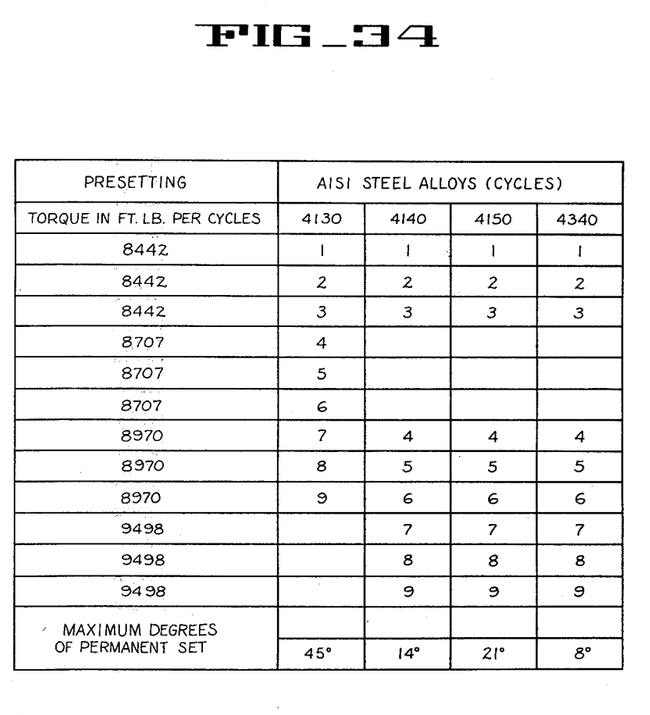
FIG. 34 is a chart illustrating the preferred presetting torques, the number of presetting cycles, and the maximum degree of permanent set for AISI 4130; 4140; 4150 and 4340 alloy steels.

Preferably the presetting of each of the four alloys described herein is accomplished in nine cycles, starting each cycle at 0 foot pounds of torque and terminating each cycle at the prescribed torque indicated in FIG. 34. If desired, the start of each cycle need not be reduced to 0 foot pounds but should be reduced to below at least one half of the prescribed torque. The maximum allowable set angle for each cycle during testing is 3°, and the largest number of degrees of permanent set being highest for the softest metal which is AISI 4130 as indicated in FIG. 34. It will be understood that the permanent set indicated in FIG. 34 does not include the tooth angles illustrated in FIGS. 3 and 4.

Protective Surface Treatment

As mentioned previously, it has been determined that marks, such as nicks, scratches, corrosive action, and tool marks on the outer surface of the bar frequently cause the bar to fail at the mark. Accordingly, to avoid surface damage to the bar, the surface is preferably treated to minimize the formation of such marks on the bar after heat treatment and presetting, and also to minimize the effect of any existing marks on the bar before or after presetting.

One way of protecting the surface of the bar is to apply a protective coating to the bar after first cleaning the bar and then applying an adhesive priming solution to the outer surface of the bar. The primer bar is then coated with a plastic such a Plastisol, Types 1 or 2, Class 2. A thickness of about 0.06 plus or minus 0.03 inches is adequate, with the coating covering the body of the bar but not the splines. A zinc rich primer is applied at a thickness of about 1.0 to 2.0 mils thick over the clean uncoated surface of the bar ends of the bar.

Another way of protecting the surface of certain bars, such as bars with less than desired compressive stress in its surface, is to shot peen the body of the bar, which shot peening may be the only protective surface treatment, or may be followed by priming and coating as indicated above.

Theoretical Analysis of Hardening and Cold Working

Although the precise effect the case hardening and cold working steps of the method of the present invention has upon the composition of the bar is not completely understood, the step-by-step theoretical explanation and stress analysis to follow is believed to provide a close approximation of the stresses within the bar. The step-by-step analysis will be described with the aid of the stress diagrams of FIGS. 7 through 18 each of which illustrates stresses applied to one of the elements E (FIG. 5) in the surface of the induction hardened case 42 of the bar. After describing the stresses acting on the case, the stresses applied to element E' in the outer portion of the core 44 adjacent to the interface 46 will be described with the aid of FIGS. 19 to 28. It will be understood that the stresses given in this theoretical analysis are approximations only and have not been derived from any specific test data.

Figure 8:
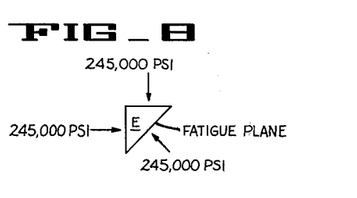

In general, it is known that torsion bars fail in tension along an angle relative to the axis of rotation of the bar as represented by the surface identified as the "fatigue plane" in FIG. 8. A high induced compressive stress near the surface is desirable since it balances out or minimizes the tensile stresses in the bar. In accordance with the present invention these induced compressive stresses are produced by hardening the case 42 by induction hardening or the like, but not the core 44, of alloy steels of medium carbon content or other steels having equivalent hardenability characteristics. The induced compressive stresses due to case hardening are preferably aided by torsional stresses induced in the bar by cold working the bar after the case hardening step.

During case hardening, the case is quickly heated above the lower transformation temperature to about 1550°-1600° F. and is thereafter quickly cooled to maintain the core below its lower transformation temperature. In response to austenite in the case transforming into martensite and thus expanding, and because such transformation does not occur in the core, the core resists the case expansion and induces hoop and axial compressive stresses as well as radial tensile stresses in the case. The magnitude of these induced stresses is determined by the strength of the core to resist expansion, the strength of the case to core interface diagrammatically illustrated at 46 in FIG. 6, and the percent of martensite in the case at various depths from the surface of the bar. It is desirable that the case be of variable hardness with the highest percentage of martensite and thus the hardest portion of the bar being at or near the surface.

The differences between bars having cases of uniform hardness and bars having cases of variable hardness with the highest percent of martensite at or near the surface is substantial. Cases of uniform hardness are analogous to a uniformly heated unrestrained tube which would expand and retract uniformly. Thus, all compressive strength induced in the case of such uniform bars must be induced totally by the core, which stress is so high that yielding occurs resulting in loss of initial compressive stress at the surface. On the other hand, a case of variable hardness would be analogous to heating a tube from the outside and cooling it from the inside. This tubular case by itself would create compressive stresses on the external surface and tensile stresses on the internal surface. The hardened core within the variable hardness case thus assists case stresses in providing desirable compressive stress in the surface of the case.

The ideal torsion bar is believed to be a torsion bar having a case depth equal to the radius of the bar and being of variable hardness with the external surface having the greatest percentage of martensite, which percentage of martensite progressively reduces until no martensite is present at the center of the bar.

In the following step-by-step theoretical analysis, FIGS. 7-18 illustrate the stresses acting on the case alone without the aid of the stresses applied by the core being considered.

Stresses Applied To Case Alone

Figure 7:
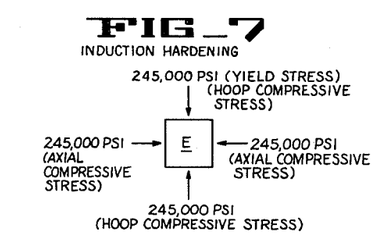
FIGS. 7-18 are stress diagrams illustrating typical stresses acting on an element in the surface of the torsion bar case at progressive stages of the method, said diagrams being provided for aiding the theoretical explanation of the stresses applied to each element.

FIG. 7 represents induced compressive stresses of 245,000 psi acting on each and every element E in the surface of the case after the case has been case hardened in accordance with the present invention. FIG. 8 illustrates the angled "fatigue plane" along which the bar will fail when tested to destruction.

Figure 9:
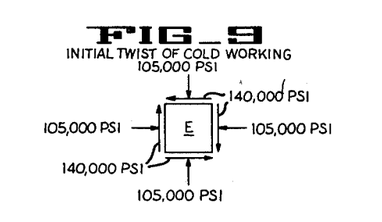
Figure 10:
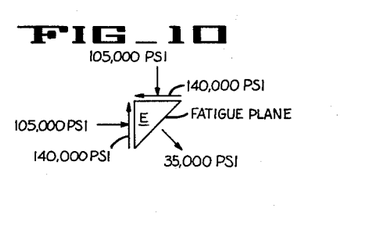
Figure 11:
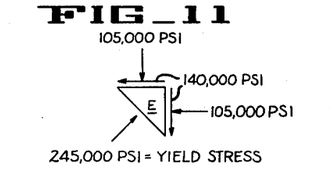
Figure 12:
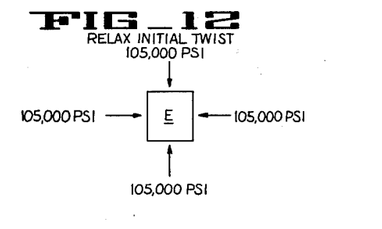

FIGS. 9, 10 and 11 illustrate the distribution of stresses during initial cold working or presetting step. During cold working, a torsional stress illustrated at 140,000 psi is superimposed on each element E to apply a compressive stress of 105,000 psi (245,000−140,000) and a torsional shear stress (twisting stress) of 140,000 psi as indicated in FIG. 9. The stress normal to the fatigue plane is 245,000 psi in compression (140,000+105,000) as indicated in FIG. 11 causing the metal to yield along this plane during the initial twist. The stresses acting upon a fatigue plane are subtractive as indicated by the direction of the arrows in FIG. 10 thus applying a 35,000 psi tensile stress (140,000−105,000) to that plane of the element E during initial cold working. FIG. 12 illustrates the resulting theoretical stresses on each element E after the initial twisting stresses of the cold working step has been reduced to 0 and assuming that no residual torque remains in the element. It will be seen that the stresses acting on the element E are 105,000 psi in compression as indicated by the arrows.

Figure 13:
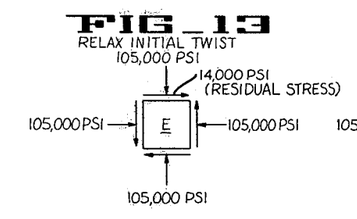
Figure 14:
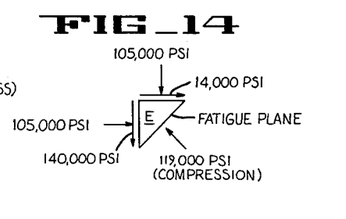
Figure 15:
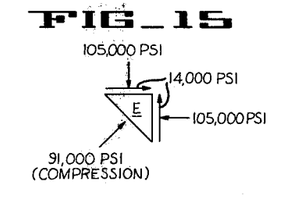

However, relaxing of the initial torque induces a residual torque or stress in the bar in a direction opposite to the direction of twist of the bar, which residual stress is assumed to be 10% of the presetting stress or 14,000 psi in the present analysis. Thus, the stress distribution after relaxation is as indicated in FIG. 13. FIG. 14 indicates that the stress acting on the fatigue plane are additive thus providing a stress of 119,000 psi acting on the fatigue plane after induction hardening and after initial cold working. A compressive stress of 91,000 psi (105,000−14,000) along the plane normal to the fatigue plane is illustrated in FIG. 15.

Figure 16:
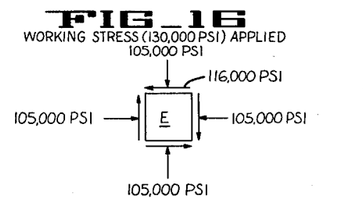
Figure 17:
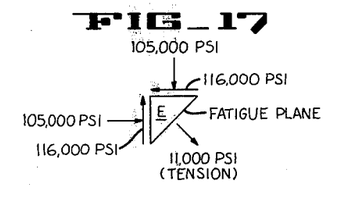
Figure 18:
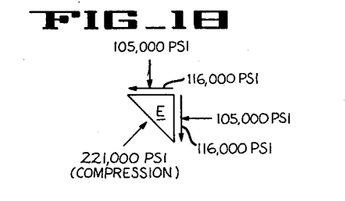

FIGS. 16, 17 and 18 illustrate the stresses when a 130,000 psi working stress is applied in the direction of preset to the outer surface of the case. FIG. 16 illustrates the compressive stress of 105,000 psi and a resulting twisting stress of 116,000 psi (130,000−14,000 residual stress) being applied to the element. FIG. 17 indicates that the forces are subtractive as indicated by the direction of the arrows providing a stress along the fatigue plane of 11,000 psi in tension. The stress along a plane normal to the fatigue plane is 221,000 psi (105,000+116,000) when a working stress of 130,000 psi is applied as indicated in FIG. 18. Thus, critical surface stresses along the fatigue plane range from 11,000 psi tension to 119,000 psi compression.

Stresses Applied To Core After Hardening Of Case

The above discussion concerned the stresses on the outer surface of the case. Induction hardening also produces a compressive hoop stress at the inner radius of the case and a tensile stress at the surface of the core. In general the core tensile stresses are excessive and are at yield before presetting. Presetting lowers the tensile stresses and produces a residual torsional stress in a direction opposite to the preset direction when the external presetting torque is reduced to zero.

Figure 19:
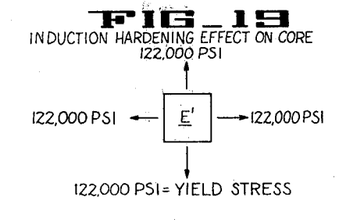
FIGS. 19-28 are stress diagrams illustrating typical stresses acting on an element in the core adjacent to its interface with the case, at progressive stages of the method, said diagrams being used for aiding the theoretical explanation of the stresses acting upon the core.

The processing steps and resulting stress acting on the core are described below and are illustrated in FIGS. 19 to 28. In this analysis it is assumed that the core hardness in Rockwell C31 providing a tensile yield strength of about 122,000 psi and a torsional (shear) yield strength of about 70,000 psi. FIG. 19 illustrates tensile stresses of 122,000 psi acting on an element E' of the core which element is approximately at the interface 46 (FIG. 5) before cold working takes place.

Figure 20:
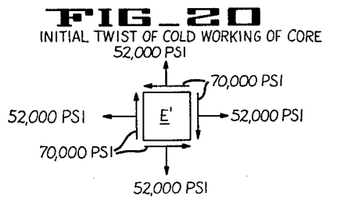
Figure 21:
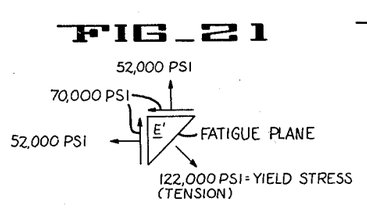
Figure 22:
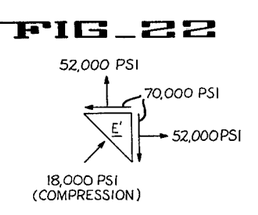

FIGS. 20, 21 and 22 illustrate the stresses applied to element E' of the core during initial cold working. Since torsional yielding of the core occurs at 70,000 psi, the core is unable to withstand the required preset torque for the case. However, the strength of the core can be increased by cold working which is accomplished by successively twisting and releasing the bar while progressively building up the torque with each twist or group of twists. Without cold working, a torsion bar would either fail very early under working loads or would gradually cold work itself to a higher yield strength while in operation. This cold working while in operation is undesirable since the working torque may be excessive early in the torsion bars life thus causing early failure and also since operational cold working causes excessive creep from its initial installed position thus requiring angular readjustment after the bar has been operationally worked for a suitable break in period.

FIG. 20 represents the stresses acting on the element E' during the initial cold working twist when applying a torsional or shear stress of 70,000 psi indicating tensile stresses of 52,000 psi (122,000−70,000) and the 70,000 psi shear stress. FIG. 21 indicates that the fatigue plane of the core adjacent the interface 46 is subjected to the tensile stress of 122,000 psi since the 52,000 psi tensile stress and the 70,000 psi torsional stress are additive at the fatigue plane as indicated by the arrows. FIG. 22 indicates that a compessive stress of 18,000 psi (70,000−52,000) acts on the plane normal to the fatigue plane.

Figure 23:
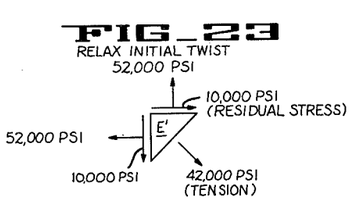
Figure 24:
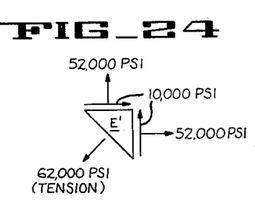

After the initial twisting stress has been relaxed to 0, assume a residual torsional stress of 10,000 psi remains in the core in opposition to the direction of applied torque during twisting. FIG. 23 indicates that the residual torsional stress reduces the tensile stress acting on the fatigue plane to 42,000 psi (52,000−10,000); while FIG. 24 indicates that the residual torsional stress provides a tensile stress on a plane that is normal to the fatigue plane of 62,000 psi.

Figure 25:
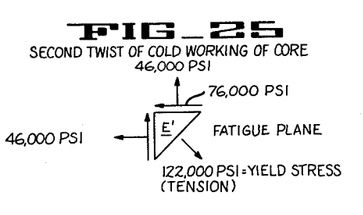
Figure 26:
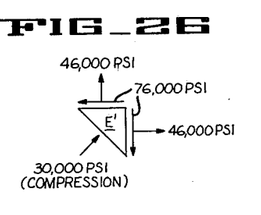

FIGS. 25 and 26 indicate the stresses acting on the core element E' when the element is being subjected to a second twisting or cold working with a torsional stress of 86,000 psi. Because of the opposed 10,000 psi residual torsional stress remaining in the core after the initial twisting action has been released, the effective applied torsional stress is 76,000 psi (86,000−10,000) and the hoop axial tensile stress is reduced to 46,000 psi (122,000−76,000). This again results in a tensile stress of 122,000 psi (FIG. 25) at the fatigue plane and a compressive stress of 30,000 psi (FIG. 26) on a plane 90° to the fatigue plane.

Alternately twisting and relaxing while gradually increasing the twisting torque is repeated a number of times, a total of nine times being preferred for the four alloy steels tested, until the desired preset torque is reached. This repeated cold working gradually builds up a residual torsional stress in a direction opposite to the applied torque until it reaches a level where it counterbalances the working stress so that the maximum stress in the core will not exceed the yield stress illustrated as 122,000 psi.

Figure 27:
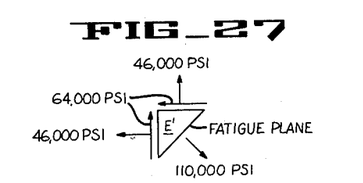
Figure 28:
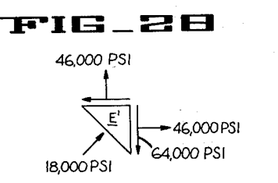

After the bar has been cold worked by twisting and relaxing the desired number of times, it will be assumed that a final residual torsional stress of 16,000 psi has been achieved and that a torsional working stress of 80,000 psi will be applied to the bar. FIGS. 27 and 28 illustrate that the working stress of 80,000 psi minus the residual torsional stress of 16,000 psi applies a torsional stress of 64,000 psi and a tensile hoop and axial stress of 46,000 psi to the element E'. This results in reducing the high initial tensile stress of 122,000 psi at the fatigue plane to an acceptable 110,000 psi. FIG. 28 indicates that the stress applied to a plane normal to the fatigue plane is a compressive stress of 18,000 psi.

Figure 29:
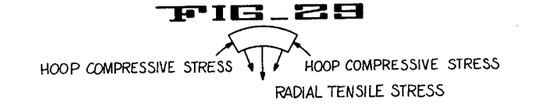
FIG. 29 is a stress diagram illustrating compressive hoop stresses and radial tensile stresses acting on a segment of the case with the view taken transversely of the axis of the bar.
Figure 30:
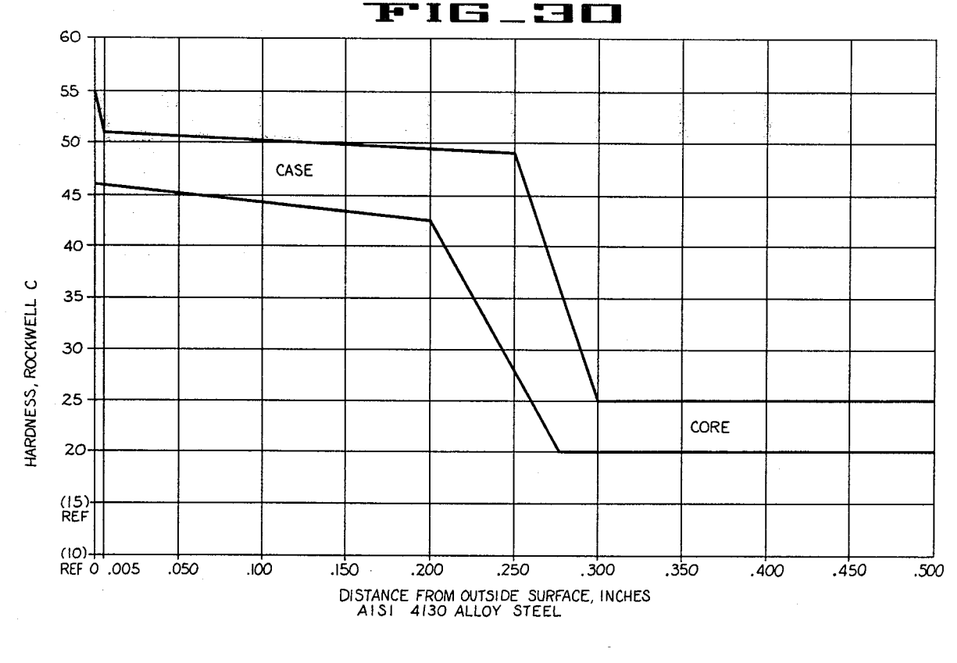
FIGS. 30-33 are graphs indicating the permissible Rockwell C hardness ranges of the case, the interface, and the core at different depths from the surface of the bar for AISI 4130; 4140; 4150 and 4340 alloy steels, respectively.
Figure 31:
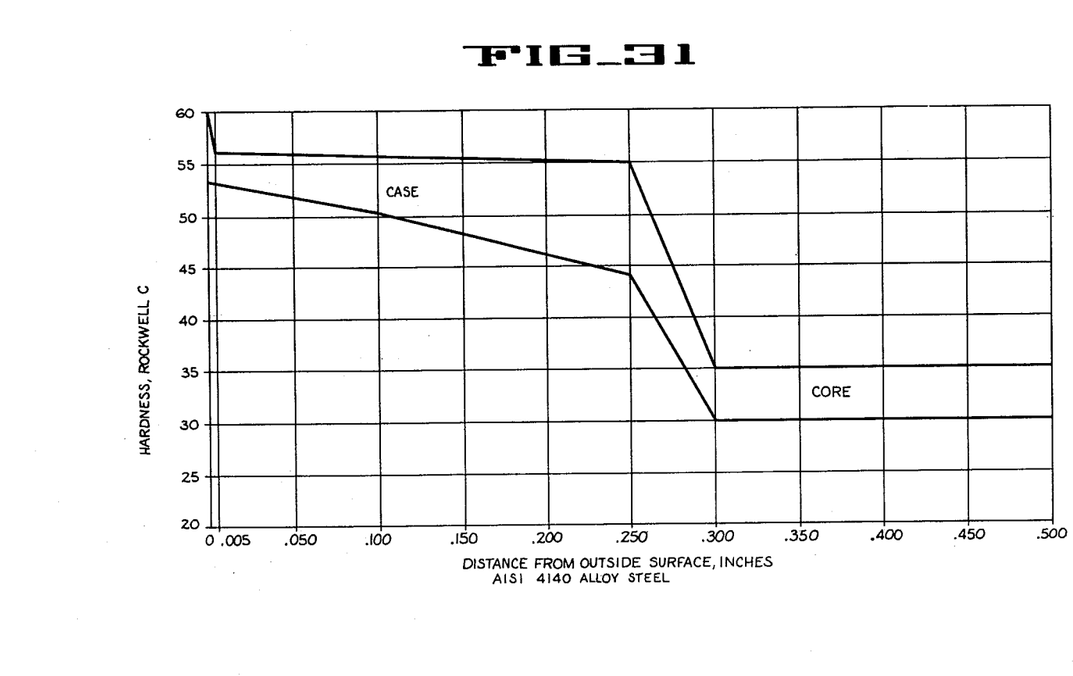
Figure 32:
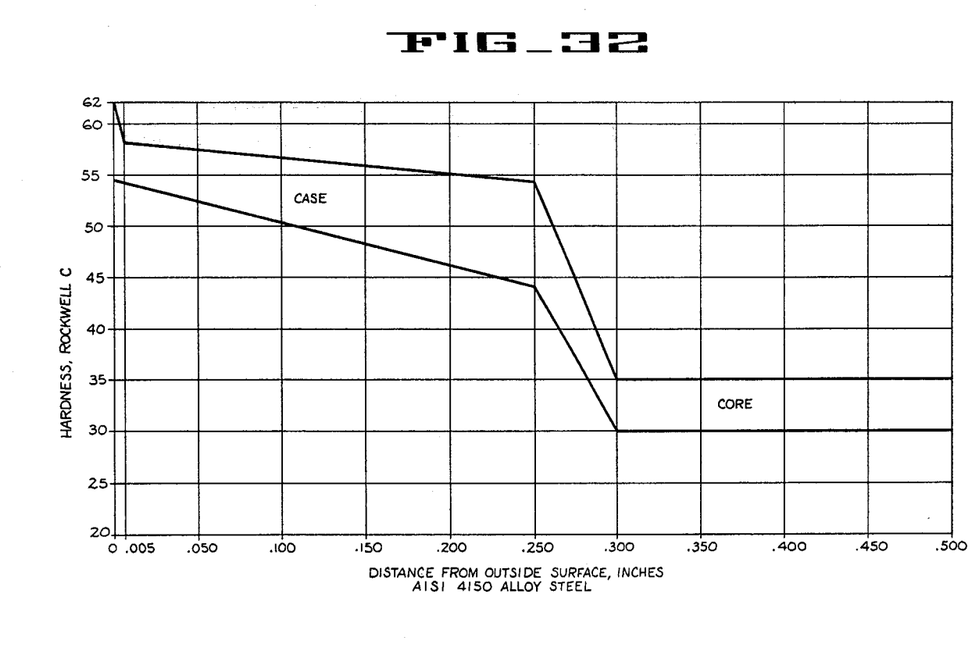
Figure 33:
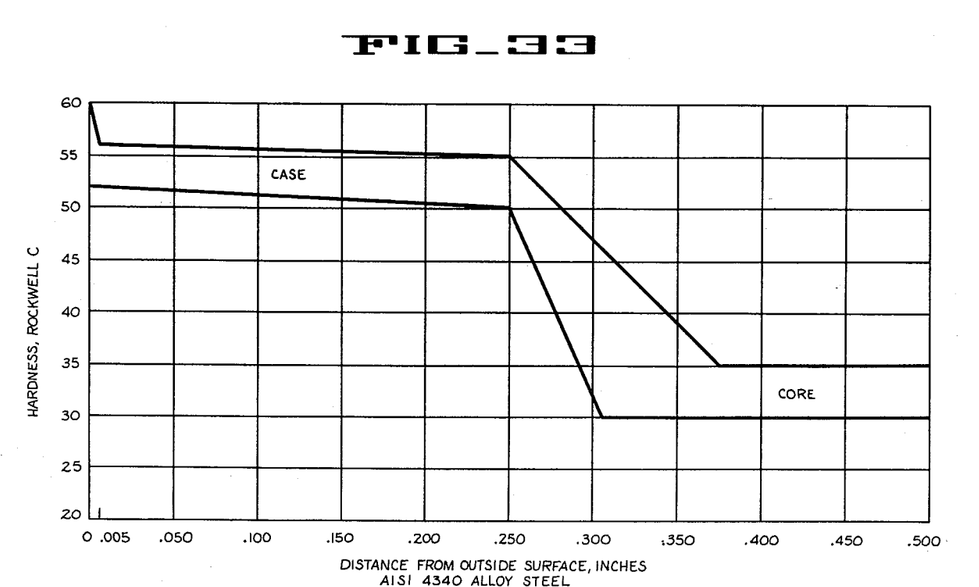

In addition to the above stresses, it is recognized that the compressive hoop stress induced in the case by induction hardening is balanced by a radial tensile stress. This radial tensile stress is provided by the tensile stress in the case or core as illustrated in FIG. 29. The magnitude of the radial tensile stresses have not as yet been accurately resolved.

From the foregoing description it is apparent that a torsion bar and method of forming the same is disclosed resulting in a bar having a longer life than prior art torsion bars of the same size and shape. The method includes the steps of selecting an alloy steel of medium carbon content (or a steel having similar hardenability characteristics), through hardening the bar to provide a core of sufficient hardness, and hardening the case to transform the structure to austenite by heating and then into martensite by rapid cooling, thereby inducing compressive hoop and axial stress in the case.

Although the best mode contemplated for carrying out the present invention has been herein shown and described it will be apparent that modification and variation may be made without departing from what is regarded to be the subject matter of the invention.

We claim:

1. A method of forming a torsion bar or the like having an outer case and a core from a steel alloy bar of the desired size and shape and with a medium carbon content, or from a steel bar having similar hardenability characteristics; comprising the steps of through hardening the bar to a predetermined hardness of about Rockwell C 30 to C 40, case hardening the bar for transforming austenite in the case into martensite which expands inducing a high compressive stress near the surface of the bar with the compressive stresses diminishing radially inward to the center of the bar, and retaining the core at a temperature below the transformation temperature for resisting expansion of both the case and the core and for inducing hoop and axial compressive stresses and radial tensile stresses in the case.

2. A method according to claim 1 wherein the steel bar is a steel alloy bar having a carbon content within the range of about 0.28% to 0.60% carbon.

3. A method according to claim 1 wherein the bar is through hardened to provide a core hardness of between about Rockwell C 30 to C 40.

4. A method according to claim 1 wherein the case hardening step is performed by induction hardening which provides a case depth of between about 25% to 40% of the bar radius.

5. A method according to claim 1 wherein induction hardening is effective to provide a minimum hardness at 0.01 inches below the surface of the case of Rockwell C 46.

6. A method according to claim 2 wherein the selected steel alloy has a carbon content of about 0.4% to 0.53%, and additionally comprising the step of drawing the torsion bar at a temperature up to about 400° F. after induction hardening.

7. An induction hardened torsion bar comprising: an alloy steel bar having a body of circular cross section and hardenability characteristics the same as or similar to an alloy steel having a medium carbon content within the range of about 0.28% to 0.60%, said bar including an outer case and a core within the case, said case including a variable composition of martensite and austenite with a high percent of martensite being at the outer surface and diminishing to approximately 80% martensite at the interface between the case and the core, said case having an induced hardness at 0.01 inches below the surface of a minimum of Rockwell C 46 and a maximum of C 58 and being subjected to induced hoop and axial compressive stresses and radial tensile stresses, said core having a hardness within the range of about Rockwell C 30 to C 35.

8. A torsion bar according to claim 7 wherein the bar is generated about a linear axis.

9. An induction hardened torsion bar comprising; an alloy steel bar having a body of circular cross section and a medium carbon content within the range of about 0.28% to 0.60%, said bar including an outer case and a core with the case having a radial depth of between about 25% to 40% of the bar radius, said case including a variable composition of martensite and austenite with a high percent of the martensite being at the outer surface and diminishing to approximately 80% martensite at the interface between the case and the core, said case having an induced hardness at 0.005 inches below the surface of a minimum of Rockwell C 52 and a maximum of C 58 and being subjected to induced hoop and axial compressive stresses and radial tensile stresses, said core having a hardness within the range of about Rockwell C 30 to C 40.

10. A torsion bar according to claim 9 wherein the bar is generated about a linear axis and wherein said linear bar has non-circular end portions.

* * * * *